(12) United States Patent
Prokop et al.

(10) Patent No.: US 7,577,697 B2
(45) Date of Patent: Aug. 18, 2009

(54) MEASUREMENT OF EQUALIZER SPAN ALIGNMENT WITH RESPECT TO CHANNEL CONDITION

(75) Inventors: Tomasz Thomas Prokop, Glenhaven (AU); Dominic Wing-Kin Yip, Carlingford (AU)

(73) Assignee: Agere Systems Inc., Allentown, PA (US)

( * ) Notice: Subject to any disclaimer, the term of this patent is extended or adjusted under 35 U.S.C. 154(b) by 840 days.

(21) Appl. No.: 11/114,025

(22) Filed: Apr. 26, 2005

(65) Prior Publication Data

US 2006/0239340 A1    Oct. 26, 2006

(51) Int. Cl.
G06F 17/10    (2006.01)
(52) U.S. Cl. ...................................... 708/323
(58) Field of Classification Search .................. 708/323
See application file for complete search history.

(56) References Cited

U.S. PATENT DOCUMENTS

| 7,266,145 | B2 * | 9/2007 | Balasubramonian et al. ..... 375/232 |
| 7,421,021 | B2 * | 9/2008 | Balasubramonian et al. ..... 375/232 |
| 2004/0091036 | A1 * | 5/2004 | Balasubramonian et al. ..... 375/232 |

FOREIGN PATENT DOCUMENTS

WO    WO 01/20780    3/2001

OTHER PUBLICATIONS

European Search Report, Sep. 3, 2007.
Shahid U.H. Qureshi, Adaptive Equalization, Proceedings of the IEEE, New York, Sep. 1, 1985, pp. 1349-1387.

* cited by examiner

*Primary Examiner*—David H Malzahn
(74) *Attorney, Agent, or Firm*—Mendelsohn & Associates, P.C.; Yuri Gruzdkov; Steve Mendelsohn (57) ABSTRACT

The span of a linear transversal equalizer filter moves according to the current positions of the multi-paths to a receiver. The alignment of the filter span is measured quantitatively with respect to the current positions of the multi-paths. Adjustments are made to the filter span to enable the linear transversal filter to capture most of the available energy of the transmitted signal. The low-pass-filtered magnitudes of tap weights of the linear filter are multiplied with values of a function which has zeroes at desired points for the larger tap weights, and a gradient of the function at its zeroes being non-zero. The magnitude of the alignment measurement signal is used as a quantitative measure of the alignment of the equalizer span, while the sign of the alignment measurement signal can be used to decide the direction that the span should be moved in.

22 Claims, 6 Drawing Sheets

Possible Functions f for 2 multipaths

MEASUREMENT OF EQUALIZER SPAN ALIGNMENT WITH RESPECT TO CHANNEL CONDITION

BACKGROUND OF THE INVENTION

1. Field of the Invention

This invention relates to linear filters. More particularly, it relates to architecture including a linear transversal equalizer.

2. Background of Related Art

Third Generation (3G) Universal Mobile Telecommunications System (UMTS) designs offer mobile operators significant capacity and broadband capabilities to support great numbers of voice and data customers—especially in urban centers. Making use of radio spectrum in bands identified by the International Telecommunications Union (ITU) and subsequently licensed to operators, 3G/UMTS employs a 5 MHz channel carrier width to deliver significantly higher data rates and increased capacity as compared with second generation networks. This 5 MHz channel carrier provides optimum use of radio resources, especially for operators who have been granted large, contiguous blocks of spectrum—typically ranging from 2×10 MHz up to 2×20 MHz—to reduce the cost of deploying 3G networks.

3G/UMTS has been specified as an integrated solution for mobile voice and data with wide area coverage. Universally standardized via the Third Generation Partnership Project (www.3gpp.org) and using globally harmonized spectrum in paired and unpaired bands, 3G/UMTS in its initial phase offers theoretical bit rates of up to 384 kbps in high mobility situations, rising as high as 2 Mbps in stationary/nomadic user environments. Symmetry between uplink and downlink data rates when using paired (FDD) spectrum also means that 3G/UMTS is ideally suited for applications such as real-time video telephony—in contrast with other technologies such as Asynchronous Digital Subscriber Line (ADSL) where there is a pronounced asymmetry between uplink and downlink throughput rates.

Specified and implemented as an end-to-end mobile system, 3G/UMTS also features the additional benefits of automatic international roaming plus integral security and billing functions, allowing operators to migrate from 2G to 3G while retaining many of their existing back-office systems. Offering increased capacity and speed at lower incremental cost as compared with second generation mobile systems, 3G/UMTS gives operators the flexibility to introduce new multimedia services to business users and consumers while providing an enhanced user experience. This in turn provides the opportunity for operators to build on the brand-based relationships they already enjoy with their customers—and drive new revenue opportunities by encouraging additional traffic, stimulating new usage patterns and strengthening customer loyalty.

Ongoing technical work within 3GPP will see further increases in throughput speeds of the WCDMA Radio Access Network (RAN). High Speed Downlink Packet Access (HSDPA) and High Speed Uplink Packet Access (HSUPA) technologies are already standardized and are undergoing network trials with operators in the Far East and North America. Promising theoretical downlink speeds as high as 14.4 Mbps (and respectively 5.8 Mbps uplink), these technologies will play an instrumental role in positioning 3G/UMTS as a key enabler for true 'mobile broadband'. Offering data transmission speeds on the same order of magnitude as today's Ethernet-based networks that are a ubiquitous feature of the fixed-line environment, 3G/UMTS will offer enterprise customers and consumers all the benefits of broadband connectivity whilst on the move.

The linear transversal equalizer (LTE) has been one of the more encouraging technologies for receivers in high-speed data transmission, e.g. high speed downlink packet access (HSDPA) in communications systems conforming to standards promulgated by the Third Generation Partnership Project (3GPP). This is because of the simplicity of a linear transversal equalizer, and its ability to cancel inter-symbol interference (ISI).

A linear transversal equalizer is essentially a linear filter on a delay-line of received complex data. The linear transversal equalizer has multiple taps (i.e., samples), and each filter tap is multiplied by a complex weight.

Figure 6:
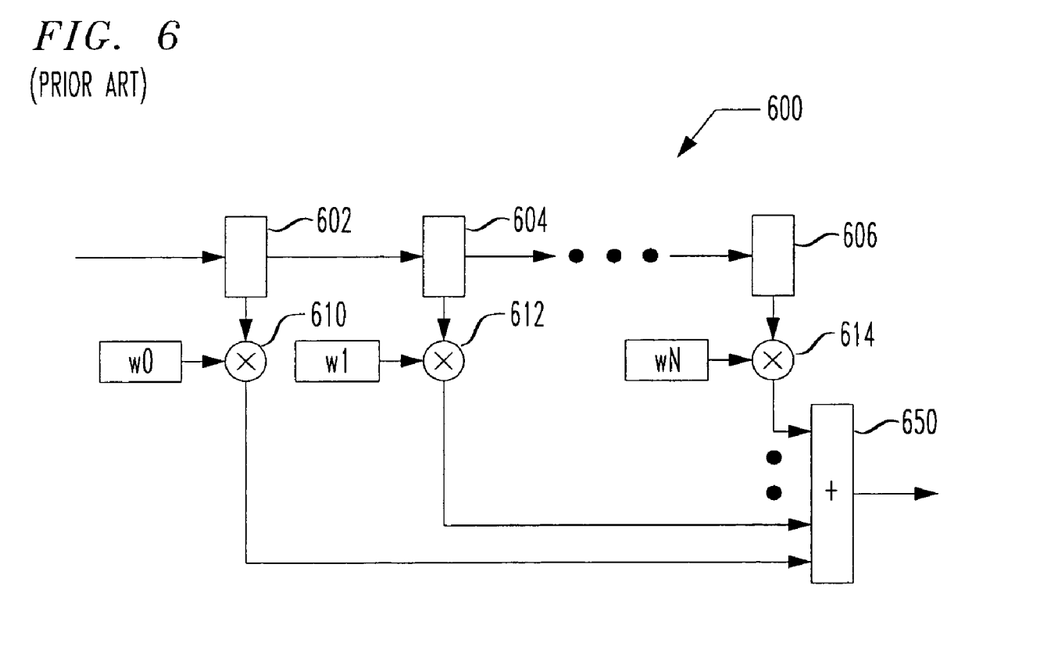
FIG. 6 depicts a conventional linear transversal equalizer.

FIG. 6 depicts a conventional linear transversal equalizer.

In particular, as shown in FIG. 6, a conventional linear transversal equalizer 600 includes multiple taps (i.e. samples) 602, 604, 606, each with a respective tap weight w0, w1, wN. Tap 604 is delayed from tap 602, and tap 606 is delayed from tap 604. The signal at each tap 602, 604, 606 is multiplied by its respective tap weight w0, w1, wN, as depicted by multipliers 610, 612, 614. The results of each of these multiplications, i.e., of each tap multiplied by its respective tap weight, in sum result in a total signal at output 650 having a given signal strength.

One of the difficulties faced by conventional linear transversal equalizers is that the transmitted signal spreads temporally due to multi-paths introduced by the channel as the receiver moves about.

Multi-paths are caused by reflections and other disturbances between the transmitter and the receiver. Differing paths of reflections cause the receiver to see multiple 'sources' of the same transmitted signal, the multiple 'sources' traveling over different paths. Since the paths are not all of the same length, the multiple reflections or 'sources' of a same transmitted signal may arrive at a receiver at slightly differing times.

Figure 7:
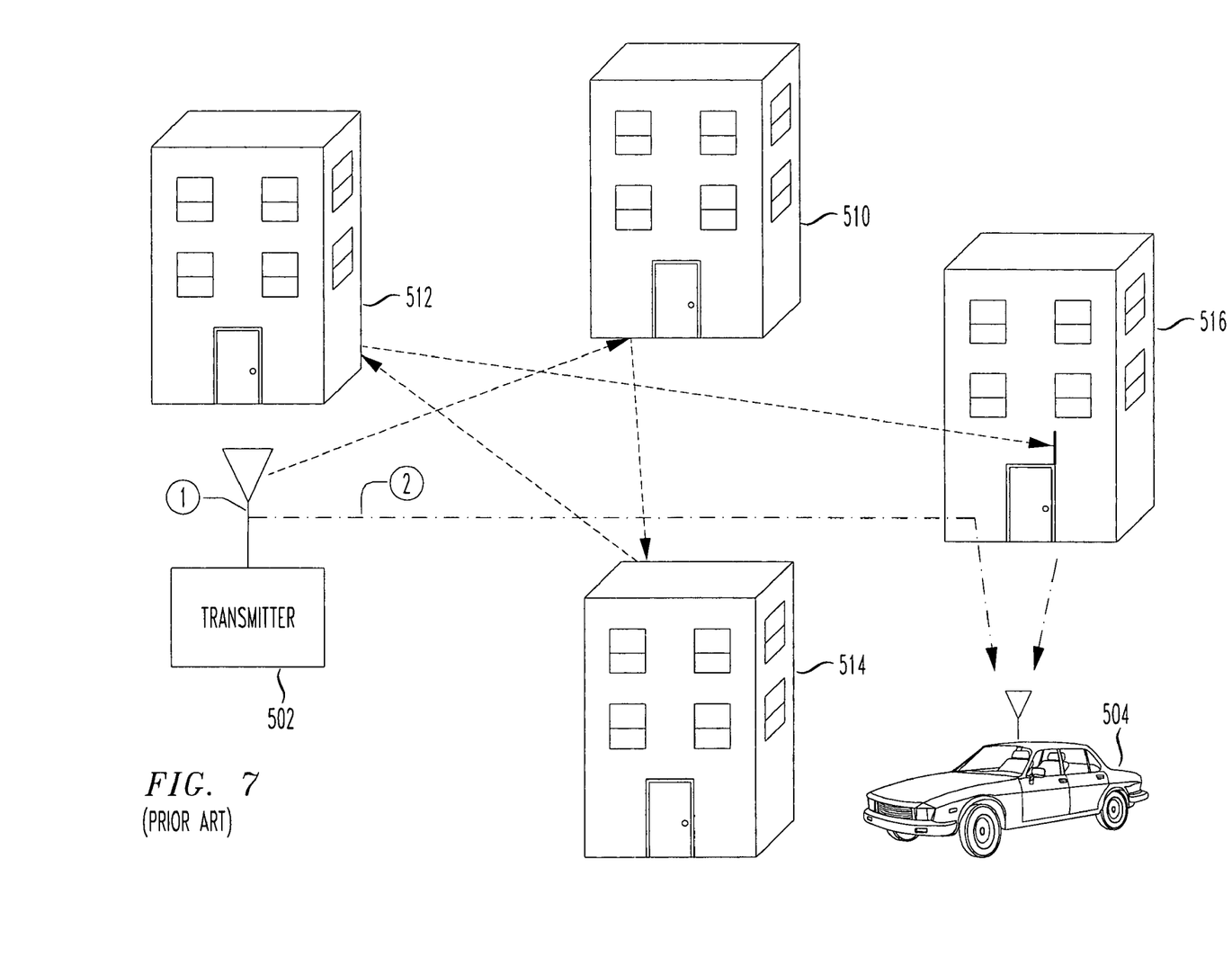
FIG. 7 shows multi-paths in a conventional mobile communications system.

As an example, FIG. 7 shows multi-paths in a conventional mobile communications system. As shown in FIG. 7, a transmitter 502 transmits a signal to a mobile receiver 504. To exemplify the multitude of paths that might be possible in any particular situation, two paths (1) and (2) are shown.

Path (1) first reflects off building 510, then off building 514, then off building 512, then off building 516, and finally reaches its destination receiver 504. A more direct path (2) reflects off only building 516 before reaching the receiver 504. Of course, it is also possible that a signal be directly received by the receiver 504 without any reflections. Needless to say, the different paths that a portion of the signal takes before being received by the receiver 504 each require a given amount of time to make the trip.

Multi-path movements are generally tracked by adjustments of tap weights on linear transversal filters (S. Qureshi, "*Adaptive Equalization*", Processing of IEEE (1985)). As the delay of a particular path changes, the magnitude of the tap weight corresponding to the old delay is decreased, while the magnitude of the tap weight corresponding to the new delay is increased.

As the delay spread of the multi-paths moves beyond the span of the particular linear transversal filter, the signals taking paths that are positioned outside the filter span are not captured by the linear transversal equalizer. This loss of some portion of the original signal effectively reduces the total signal strength received by the receiver.

There is a need for reduced signal loss due to dropped multi-path signals, so that overall signal strength of a received signal through a linear transversal equalizer is increased.

SUMMARY OF THE INVENTION

In accordance with the principles of the present invention, a receiver device including a linear transversal equalizer comprises a filter multiplies each of a plurality of taps by respective ones of a plurality of tap weights to generate a plurality of tap products. A filter combinatorial module combines the plurality of tap products into an output of the linear transversal equalizer. An alignment multiplier multiplies each of a plurality of function values by respective ones of the plurality of tap weights to generate a plurality of alignment products. An alignment combinatorial module combines the plurality of alignment products into an alignment measure signal. A span of the linear transversal equalizer is controlled by the alignment measure signal.

A method of adjusting a span of a linear transversal equalizer in accordance with another aspect of the present invention comprises multiplying each of a plurality of tap weights of the linear transversal equalizer by a respective one of a plurality of function values to generate a corresponding plurality of alignment products. The plurality of alignment products are combined to generate an alignment measure signal. The span of the linear transversal equalizer is adjusted based on a value of the alignment measure signal.

BRIEF DESCRIPTION OF THE DRAWINGS

Features and advantages of the present invention will become apparent to those skilled in the art from the following description with reference to the drawings, in which.

DETAILED DESCRIPTION OF THE ILLUSTRATIVE EMBODIMENTS

In accordance with the principles of the present invention, a linear transversal equalizer is provided which covers the temporal spread of a transmitted signal due to multi-paths introduced by the channel. As the receiver moves in space with respect to the signal source, the span of the inventive linear transversal equalizer moves according to the current positions of the multi-paths. In particular, the present invention measures quantitatively how accurately the filter span aligns with the current positions of the multi-paths. Using this alignment measurement, adjustments to the filter span are made to enable the linear transversal filter to capture most of the available energy of the transmitted signal.

Figure 1A:
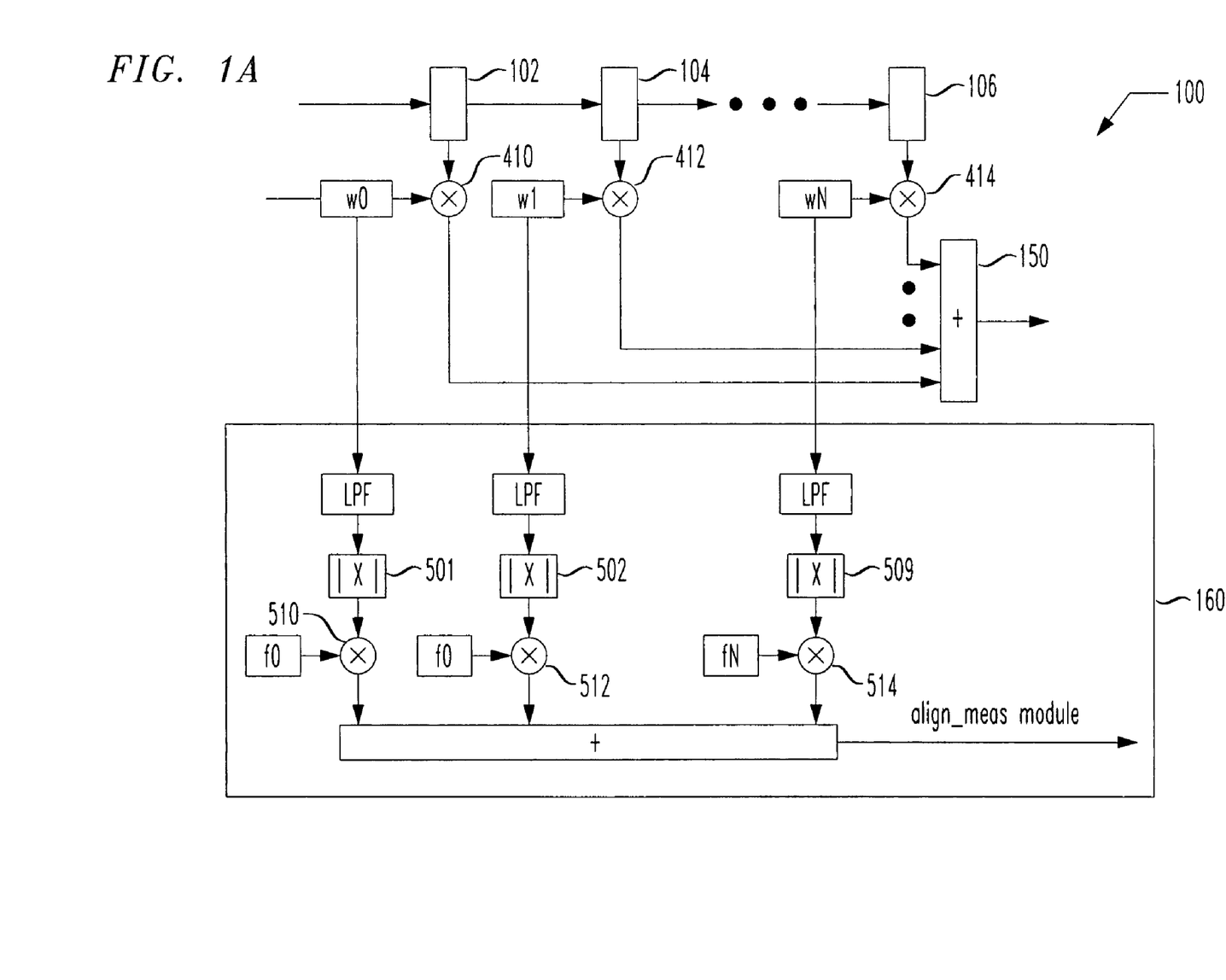
FIG. 1A-1B show two embodiments of a linear transversal equalizer including an alignment measure module to adjust a span of the linear transversal equalizer based on the value of the alignment measure signal, in accordance with the principles of the present invention.

FIG. 1A shows a linear transversal equalizer including an alignment measure module 160 to adjust a span of the linear transversal equalizer 100 based on the value of the alignment measure signal 162, in accordance with the principles of the present invention.

In particular, as shown in FIG. 1A, a linear transversal equalizer 100 includes taps 102, 104, 106, with samples that are multiplied in multipliers 410, 412, 414 by respective tap weights w0, w1, wN. The products from each of the multipliers 410, 412, 414 is summed in a summer 150, to generate an output signal from the linear transversal equalizer 100.

In accordance with the principles of the present invention, the tap weights w0, w1, wN are input to an alignment measure module 160, where they are monitored and measured.

Each of the tap weights w0, w1, wN are converted to an absolute value, as depicted by absolute value modules 501, 502, 509, and multiplied by multipliers 510, 512, 514 by values f0, f1, fN of a predefined function f. Of course, the absolute value function may be performed after multiplication, within the principles of the present invention. Thus, the modulus of each of the tap weights (w0 to wN) of the linear transversal equalizer are calculated and multiplied with the values of a predefined function (f0 to fN). The predefined function f can be stored in an appropriate memory device, storage device, or generated by logic.

The products output by the multipliers 510, 512 and 514 are summed in a summer module 550, and output as an alignment measure signal align_meas. Then, the magnitude of the sum of products output (align_meas) is used as a quantitative measure of the alignment of the linear transversal equalizer span.

Preferably, the sign of the alignment measure signal align_meas can be used to determine the direction of misalignment. Or, stated another way, the sign of the alignment measure signal align_meas can be used to control the direction of realignment movement of the span of the linear transversal equalizer 100.

In particular, if the largest tap weight is in the middle of the span, the alignment measure signal align_meas, which is the sum of the product between the function f and the tap weights w0 to wN, is small. This indicates that the largest tap weight is currently in the middle of the span. As a result, most of the available signal energy should be captured by the linear transversal equalizer 100 and thus by the receiver. However, if the delay of the path is smaller, the largest tap weight shifts towards tap 0, and the magnitude of the alignment measure signal align_meas increases. In such a case, the sign of the alignment measure signal align_meas is positive.

If the magnitude of the alignment measure signal align_meas is larger than a specified threshold, then the linear transversal equalizer 100 can be adjusted to span on the earlier received samples. In such case, the alignment of the linear transversal equalizer is adjusted such that the largest tap weight is moved towards the middle of the span, and the magnitude of the alignment measure signal align_meas decreases. On the other hand, if the delay of the path is larger, the largest tap weight is moved towards tap N, and the magnitude of the alignment measure signal align_meas increases. In this case, the sign of the alignment measure signal align_meas is negative.

If the magnitude of the alignment measure signal align_meas is larger than a specified threshold, then the span of the linear transversal equalizer 100 can be adjusted to span on the later receiver samples. In such case, the largest tap weight is moved towards the middle of the span, and the magnitude of the alignment measure signal align_meas decreases.

Figure 2:
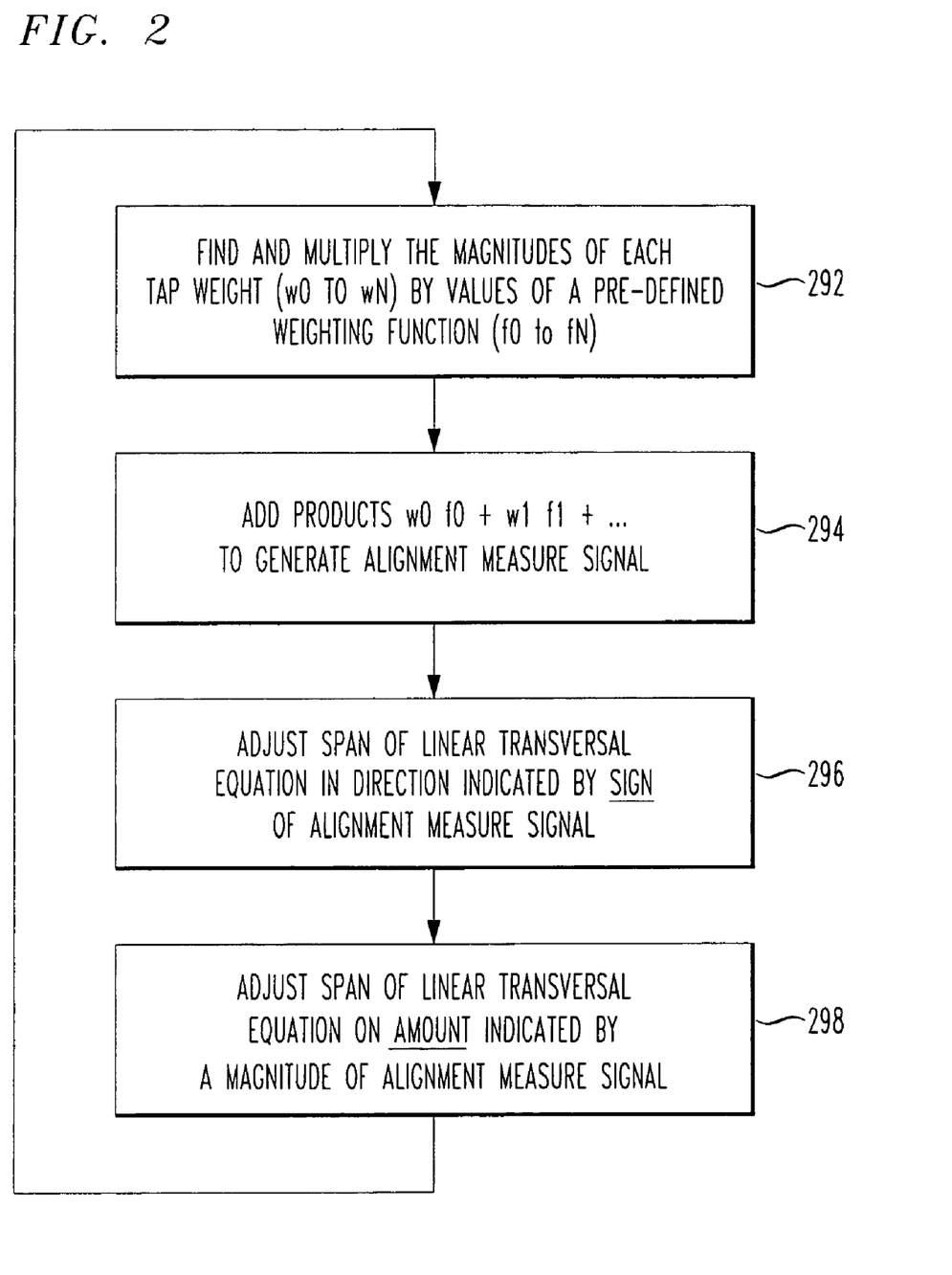
FIG. 2 shows an exemplary method of generating an alignment measure signal, and adjusting a span of a linear transversal equalizer based on the value of the alignment measure signal, in accordance with the principles of the present invention.

FIG. 2 shows an exemplary method of generating an alignment measure signal, and adjusting a span of a linear transversal equalizer based on the value of the alignment measure signal, in accordance with the principles of the present invention.

In particular, as shown in step 292 of FIG. 2, the magnitude of each tap weight w0 to wN is found, and multiplied by respective values f0 to fN of a pre-defined weighting function f.

In step 294, the weight products w0f0, w1f1, . . . wNfN are combined to generate a magnitude of an alignment measure signal. In the disclosed embodiments, the weight products are simply added. However, other combinatorial methods or techniques may be utilized to produce a suitable alignment measure signal.

Figure 1B:
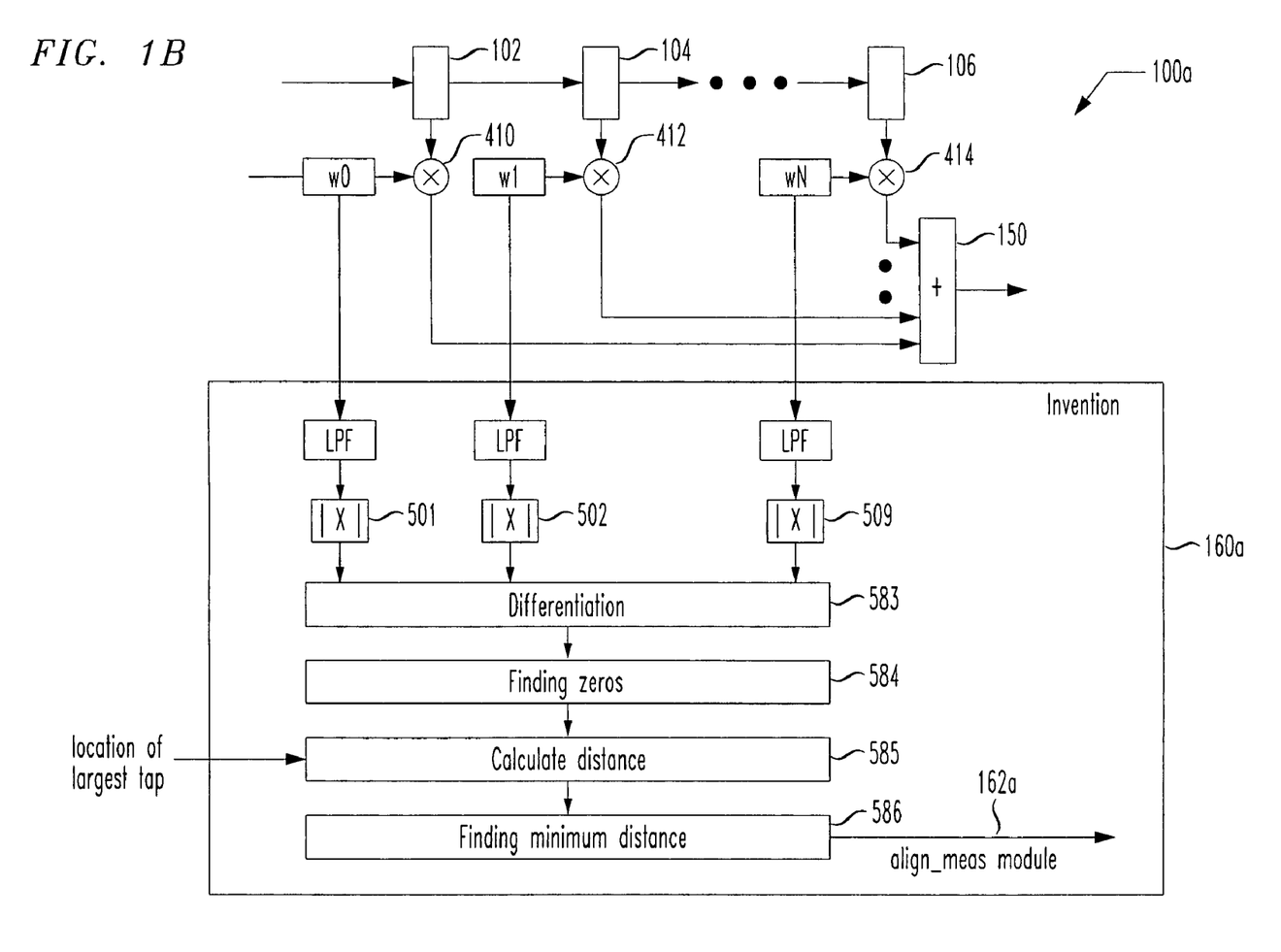

In step 296, the span of the linear transversal equation 100 (FIG. 1) is adjusted in a direction indicated by the sign of the alignment measure signal.

In step 298, the span of the linear transversal equation 100 (FIG. 1) is adjusted an amount indicated by a magnitude of the alignment measure signal.

Steps 296 and 298 may be performed in opposite order, or simultaneously, in accordance with the principles of the present invention.

The steps of FIG. 2 are re-performed preferably at each sample period. Alternatively, the steps of FIG. 2 may be performed periodically, e.g., after a fixed number of samples are input, or even based on a fixed time period, according to the principles of the invention.

Figure 3:
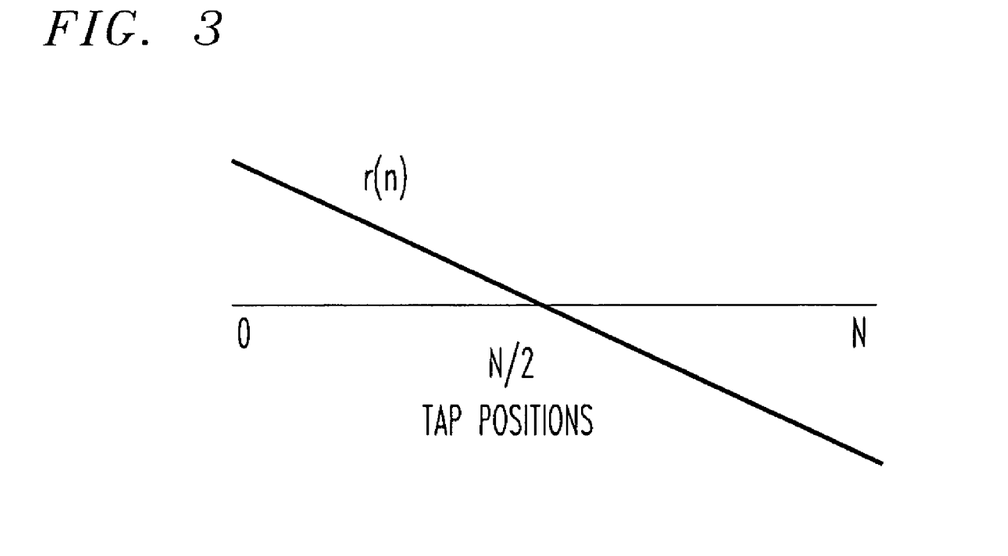
FIGS. 3 and 4 show some possible functions f that can be used to weight the products calculated by the alignment measure module to control an adjustment placing the largest tap weight to the middle of the span of the linear transversal equalizer, in accordance with the principles of the present invention.
Figure 4:
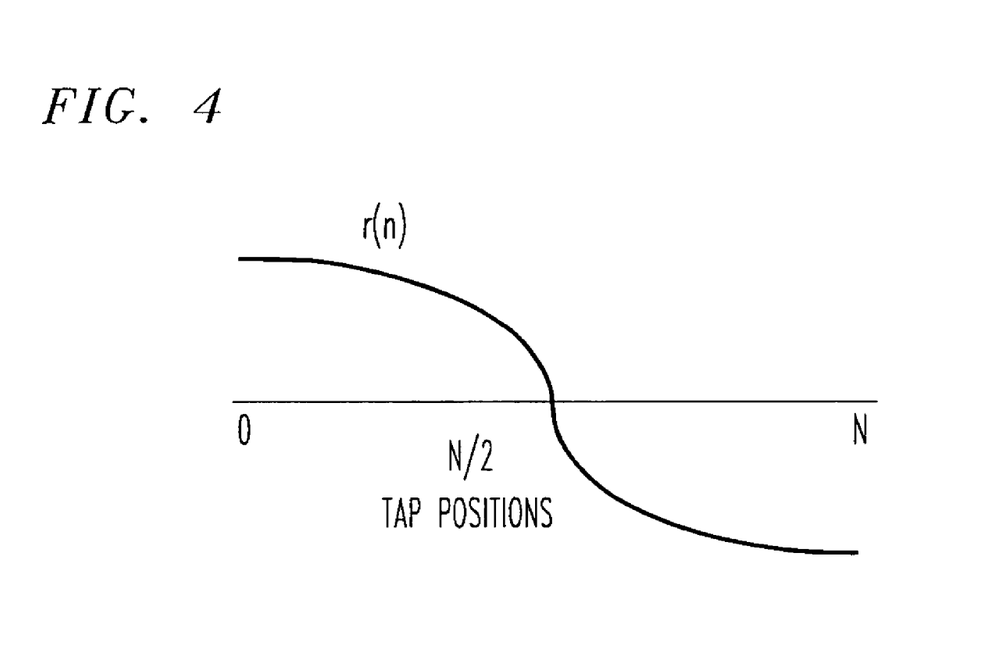

FIGS. 3 and 4 show some possible functions f that can be used to weight the products calculated by the alignment measure module to control an adjustment placing the largest tap weight to the middle of the span of the linear transversal equalizer, in accordance with the principles of the present invention.

In particular, as shown in FIG. 3, one exemplary function f is shown which is a straight line function that has negative slope, with a zero crossing at the tap position N/2.

FIG. 4 shows another exemplary function f which is a curving function with increasing negative slope between tap position 0 and tap position N/2, an infinite slope at the zero crossing at tap position N/2, and with progressively decreasing positive slope between tap position N/2 and tap position N.

FIGS. 3 and 4 show but two preferred functions f out of many possible functions f. For all pre-defined functions f, the magnitudes of tap weights w0, w1, wN of the linear transversal equalizer filter are multiplied by tap position values of the function f. Preferably, the function f has zeroes at desired points for the larger tap weights (e.g., at tap position N/2). Also, preferably, the gradient of the function f at the zeroes of the function (i.e., where the function value crosses from positive to negative) is non-zero.

Thus, while there are many possibilities for function f which can provide good alignment measurements for different channel conditions, it is preferred that the function f satisfy the following conditions:

1. That the zeroes of the function f be on taps where the larger tap weights are desired to be adjusted to be; and
2. That the gradients of the function f at all zeroes of the function f are either all positive or all negative. For example, if there are two major paths in the channel, and their corresponding taps are N/2 apart.

Figure 5:
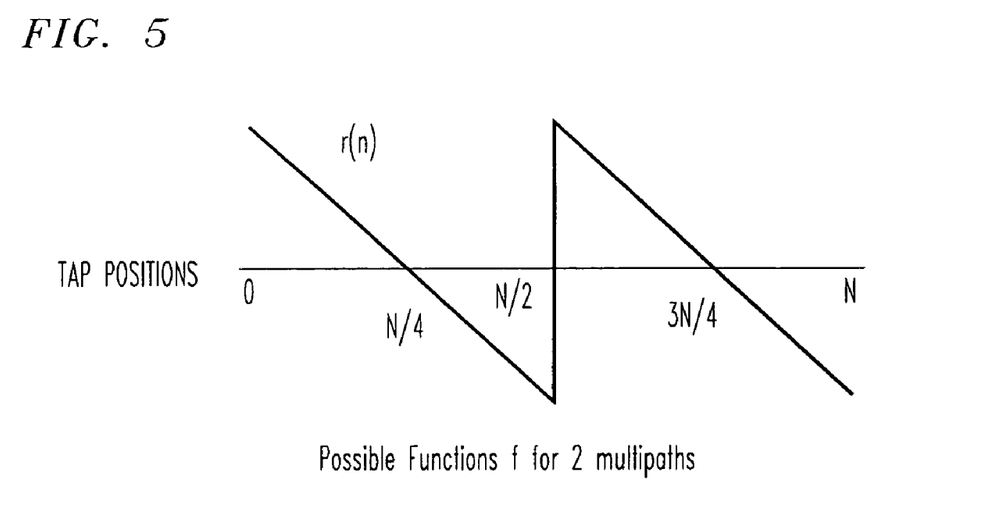
FIG. 5 shows a possible function f for two multipaths, exhibiting zero crossings at N/4, N/2, and 3N/4.

FIG. 5 shows a possible function f for two multipaths, exhibiting zero crossings at N/4, N/2, and 3N/4.

In particular, as shown in FIG. 5, the frequency of evaluation of the sum of the product between function f and weights w can be adjusted according to any knowledge on the movement of the receiver. For example, if it is known that the receiver moves very slowly, the evaluation (and thus the adjustment) should be done infrequently to reduce power consumption of the receiver.

The invention may be implemented in an integrated circuit, and/or in embedded software controlling an integrated circuit.

While the present embodiments are described wherein tap weights are multiplied by a function, and a combination of the products results in an alignment measure signal. However, the principles of the present invention relate to any linear transform on the tap weights. For example, the tap weights may each be differentiated, and the respective zeroes may be located and compared with a desired position to produce a suitable alignment measure signal (see FIG. 1B).

The present invention has advantages. For instance, it is simple to implement, has flexibility of function f so the alignment measurement can adapt to all channel conditions, and allows simple hardware implementation of equalizer span adjustment.

While the invention has been described with reference to the exemplary embodiments thereof, those skilled in the art will be able to make various modifications to the described embodiments of the invention without departing from the true spirit and scope of the invention.

What is claimed is:

1. In a receiver device, a linear transversal equalizer comprising:
   a plurality of taps;
   a plurality of tap weights;
   a first operator to transform each of said plurality of taps by respective ones of said plurality of tap weights to generate a plurality of tap products; and
   a filter combinatorial module to combine said plurality of tap products into an output of said linear transversal equalizer;
   a plurality of function values;
   an alignment multiplier to multiply each of said plurality of function values by respective ones of said plurality of tap weights to generate a plurality of alignment products; and
   an alignment combinatorial module to combine said plurality of alignment products into an alignment measure signal;
   wherein a span of said linear transversal equalizer is controlled by said alignment measure signal, wherein:
      said plurality of function values form a linear function going from a first tap toward a last tap;
      wherein one zero of said function is located at a center of said span of said linear transversal equalizer; and
      any gradients of said function at any zero of said function are either all positive or all negative.

2. Apparatus for adjusting a span of a linear transversal equalizer, comprising:
   means for performing linear transform on a plurality of tap weights of said linear transversal equalizer to generate an alignment measure signal; and
   means for adjusting said span of said linear transversal equalizer based on a value of said alignment measure signal, wherein said means for performing linear transform comprises:

means for forming a linear function based on said plurality of taps weights;

means for differentiating said linear function to form a derivative of said linear function;

means for locating zeroes in said derivative of said linear function;

means for calculating a plurality of distances between said zeroes and the desired point for largest tap; and means for combining said plurality of distances into the alignment measure signal.

3. An apparatus, comprising:

a linear transversal equalizer for transforming an input signal into an equalized signal, wherein:

the input signal is tapped to obtain a plurality of variously delayed taps;

each tap of said plurality of taps is weighted by a respective weight of a plurality of weights to form a respective weighted tap; and the weighted taps are combined to form the equalized signal; and an alignment module for aligning a span of said plurality of variously delayed taps with a temporal spread of the input signal, wherein:

a plurality of first values, each corresponding to a weight from said plurality of weights, are multiplied with a corresponding plurality of second values, each corresponding to a predefined function, to form a plurality of alignment products;

the predefined function has one or more zeros at locations intended for largest of the weights; and said alignment products are combined to form an alignment measure based on which the span is aligned with the temporal spread.

4. The apparatus of claim 3, wherein a gradient of the predefined function at a zero of said function is non-zero.

5. The apparatus of claim 4, wherein gradients of the predefined function at the zeros of said function are either all positive or all negative.

6. The apparatus of claim 3, wherein the predefined function has at least two zeros.

7. The apparatus of claim 6, wherein the predefined function has zeros at about N/4 and about 3N/4, where N is a total number of taps in said plurality of variously delayed taps.

8. The apparatus of claim 3, wherein the predefined function has a zero at about N/2, where N is a total number of taps in said plurality of variously delayed taps.

9. The apparatus of claim 3, wherein the predefined function comprises a linear function of n, where n is a tap number.

10. The apparatus of claim 3, wherein the alignment module comprises:

a plurality of low-pass filters, each for applying low-pass filtering to a corresponding weight from the plurality of weights to produce a respective filtered weight; and a plurality of absolute-value modules, each for determining a corresponding first value for the plurality of first values, said first value being an absolute value of the respective filtered weight.

11. The apparatus of claim 3, wherein a sign of the alignment measure determines direction in which the span is shifted to be aligned with the spread.

12. The apparatus of claim 11, wherein a magnitude of the alignment measure determines a magnitude of the shift.

13. A method for temporally aligning a linear transversal equalizer with an input signal, the method comprising:

tapping the input signal to obtain a plurality of variously delayed taps;

weighting each tap of said plurality of taps by a respective weight of a plurality of weights to form a respective weighted tap; and combining the weighted taps to form an equalized signal;

multiplying a plurality of first values, each corresponding to a weight from said plurality of weights, with a corresponding plurality of second values, each corresponding to a predefined function, to form a plurality of alignment products, wherein the predefined function has one or more zeros at locations intended for largest of the weights; and combining said alignment products to form an alignment measure for aligning a span of the linear transversal equalizer with a temporal spread of the input signal.

14. The method of claim 13, wherein a gradient of the predefined function at a zero of said function is non-zero.

15. The method of claim 14, wherein gradients of the predefined function at the zeros of said function are either all positive or all negative.

16. The method of claim 13, wherein the predefined function has at least two zeros.

17. The method of claim 16, wherein the predefined function has zeros at about N/4 and about 3N/4, where N is a total number of taps in said plurality of variously delayed taps.

18. The method of claim 13, wherein the predefined function has a zero at about N/2, where N is a total number of taps in said plurality of variously delayed taps.

19. The method of claim 13, wherein the predefined function comprises a linear function of n, where n is a tap number.

20. The method of claim 13, further comprising:

applying low-pass filtering to each weight from the plurality of weights to produce a respective filtered weight; and determining an absolute value of the respective filtered weight to generate a corresponding first value for the plurality of first values.

21. The method of claim 13, wherein a sign of the alignment measure determines direction in which the span is shifted to be aligned with the spread.

22. The method of claim 21, wherein a magnitude of the alignment measure determines a magnitude of the shift.

* * * * *